US009069564B1

(12) United States Patent
Rashid et al.

(10) Patent No.: US 9,069,564 B1
(45) Date of Patent: Jun. 30, 2015

(54) WEIGHTED INSTRUCTION COUNT SCHEDULING

(75) Inventors: Abbas Rashid, Pleasonton, CA (US); David T. Hass, Santa Clara, CA (US)

(73) Assignee: NETLOGIC MICROSYSTEMS, INC., Santa Clara, CA (US)

( * ) Notice: Subject to any disclaimer, the term of this patent is extended or adjusted under 35 U.S.C. 154(b) by 658 days.

(21) Appl. No.: 13/396,007

(22) Filed: Feb. 14, 2012

(51) Int. Cl.
*G06F 9/38* (2006.01)
(52) U.S. Cl.
CPC ............ *G06F 9/3851* (2013.01); *G06F 9/3802* (2013.01)
(58) Field of Classification Search
CPC combination set(s) only.
See application file for complete search history.

(56) References Cited

U.S. PATENT DOCUMENTS

| 5,860,150 | A | * | 1/1999 | Chiarot et al. | 711/213 |
| 7,984,268 | B2 | | 7/2011 | Hass et al. | |
| 2001/0056456 | A1 | * | 12/2001 | Cota-Robles | 709/103 |
| 2009/0113180 | A1 | * | 4/2009 | Banerjee et al. | 712/205 |
| 2009/0198907 | A1 | * | 8/2009 | Speight et al. | 711/137 |
| 2010/0162041 | A1 | * | 6/2010 | El-Shishiny et al. | 714/10 |
| 2011/0119674 | A1 | * | 5/2011 | Nishikawa | 718/103 |

* cited by examiner

*Primary Examiner* — Eric Coleman
(74) *Attorney, Agent, or Firm* — Sterne, Kessler, Goldstein & Fox P.L.L.C.

(57) ABSTRACT

A method and system are provided for performing efficient and effective scheduling in a multi-threaded system. Dynamic control of scheduling is provided, in which priority weights can be assigned for some or all of the threads in the multi-threaded system. The priority weights are employed to control prioritization of threads and thread instructions by a scheduler. An instruction count for each thread is used in combination with the priority weights to determine the prioritization order in which instructions are fetched and assigned to execution units for processing.

20 Claims, 17 Drawing Sheets

Calculate for each thread: (ICount * $2^{PW}$)

| Thread | ICount | PW | ICOUNT * $2^{PW}$ |
|---|---|---|---|
| Thread A | $ICount_A = 100$ | $PW_A = 0$ | ICOUNT * $2^{PW}$ = (100 * $2^0$) = 100 |
| Thread B | $ICount_B = 120$ | $PW_B = 0$ | ICOUNT * $2^{PW}$ = (120 * $2^0$) = 120 |
| Thread C | $ICount_C = 140$ | $PW_C = 0$ | ICOUNT * $2^{PW}$ = (140 * $2^0$) = 140 |
| Thread D | $ICount_D = 160$ | $PW_D = 0$ | ICOUNT * $2^{PW}$ = (160 * $2^0$) = 160 |

FIG. 6D

Identify thread with lowest value: (ICount * $2^{PW}$)

| Thread A | $ICount_A = 100$ | $PW_A = 0$ | $ICOUNT * 2^{PW} = (100 * 2^0) = 100$ |
| Thread B | $ICount_B = 120$ | $PW_B = 0$ | $ICOUNT * 2^{PW} = (120 * 2^0) = 120$ |
| Thread C | $ICount_C = 140$ | $PW_C = 0$ | $ICOUNT * 2^{PW} = (140 * 2^0) = 140$ |
| Thread D | $ICount_D = 160$ | $PW_D = 0$ | $ICOUNT * 2^{PW} = (160 * 2^0) = 160$ |

FIG. 6E

Calculate for each thread: (ICount * $2^{PW}$)

| Thread | ICount | PW | ICOUNT * $2^{PW}$ |
|---|---|---|---|
| Thread A | $ICount_A = 100$ | $PW_A = 1$ | $ICOUNT * 2^{PW} = (100 * 2^1) = 200$ |
| Thread B | $ICount_B = 120$ | $PW_B = 0$ | $ICOUNT * 2^{PW} = (120 * 2^0) = 120$ |
| Thread C | $ICount_C = 140$ | $PW_C = -1$ | $ICOUNT * 2^{PW} = (140 * 2^{-1}) = 70$ |
| Thread D | $ICount_D = 160$ | $PW_D = 0$ | $ICOUNT * 2^{PW} = (160 * 2^0) = 160$ |

FIG. 7D

Identify thread with lowest value: (ICount * $2^{PW}$)

| Thread | ICount | PW | ICOUNT * $2^{PW}$ |
|---|---|---|---|
| Thread A | $ICount_A = 100$ | $PW_A = 1$ | $ICOUNT * 2^{PW} = (100 * 2^1) = 200$ |
| Thread B | $ICount_B = 120$ | $PW_B = 0$ | $ICOUNT * 2^{PW} = (120 * 2^0) = 120$ |
| Thread C | $ICount_C = 140$ | $PW_C = -1$ | $ICOUNT * 2^{PW} = (140 * 2^{-1}) = 70$ |
| Thread D | $ICount_D = 160$ | $PW_D = 0$ | $ICOUNT * 2^{PW} = (160 * 2^0) = 160$ |

FIG. 7E

WEIGHTED INSTRUCTION COUNT SCHEDULING

FIELD

This disclosure concerns methods and mechanisms for performing scheduling in a processing system.

BACKGROUND

A processor is the portion of a computing system that carries out instructions to implement basic tasks and operations on the system. A central processing unit (CPU) is a type of processor that acts as the main processor for a computer system. A multi-core processor is a single component that includes multiple constituent processors, which are referred to as "cores".

Regardless of the actual type of processor that is used, the processor operates and performs tasks by reading and executing program instructions. Instruction scheduling is the process of managing resource allocation to execute instructions. An instruction scheduler is the component in a processor (or core within a processor) that manages the order and flow in which instructions are provided to execution units.

Many processors also implement multi-threaded processing, in which multiple threads of execution can operate in parallel to perform work in the processing system. The multiple threads in a multi-threaded system will share the resources of a single processor (e.g., including one or more cores) to perform their processing. Since the multiple threads are sharing the same basic resources, this means that there is likely to be contention for the resources that are needed to process the instructions issued by each thread.

In a multi-threaded system, instructions can therefore be scheduled with consideration of allocation of execution resources among the different threads. Thread-based scheduling is performed to make sure that the threads are allocated an appropriate amount of system resources to perform their processing.

There are many possible schemes that can be used to implement scheduling for a multi-threaded system. For example, a very straightforward approach to implement scheduling is to provide a round-robin allocation of execution resources to each thread, where instructions for the threads are selected in a round-robin order for execution. Another possible scheduling scheme is give the highest priority to the thread that currently has the lightest current execution workload (i.e., giving the highest priority to the thread having the lowest number of instructions currently being processed in the instruction pipeline).

The problem with these approaches is that they are all quite simplistic and may be disadvantageous in complicated processing scenarios when greater control is needed over the scheduling. Another issue with these approaches is that they contain relatively static allocation algorithms that do not allow for flexibility in how the scheduling is performed, which could create performance problems in the event of changing conditions where there may otherwise be a desire to change allocation of resources to the different threads.

Therefore, there is a need for an improved approach to efficiently and effectively perform scheduling in a multi-threaded system.

SUMMARY

The present disclosure describes methods and mechanisms that can more efficiently and effectively perform scheduling in a multi-threaded system with greater flexibility and control. Some embodiments provide for dynamic control of scheduling, in which priority weights can be assigned for some or all of the threads in the multi-threaded system. The priority weights are employed to control prioritization of threads and thread instructions by a scheduler. An instruction count for each thread is used in combination with the priority weights to determine the prioritization order in which instructions are fetched and assigned to execution units for processing.

Further details of aspects, objects, and advantages of various embodiments are described below in the detailed description, drawings, and claims. Both the foregoing general description and the following detailed description are exemplary and explanatory, and are not intended to be limiting as to the scope of the disclosure.

BRIEF DESCRIPTION OF THE DRAWINGS

The drawings illustrate the design and utility of embodiments, in which similar elements are referred to by common reference numerals. In order to better appreciate the advantages and objects of various embodiments, reference should be made to the accompanying drawings. However, the drawings depict only certain embodiments, and should not be taken as limiting the scope of the disclosure.

FIGS. 6A-6F and 7A-7F provide illustrative examples of approaches to implement scheduling.

DETAILED DESCRIPTION

This disclosure describes methods and mechanisms that can more efficiently and effectively perform scheduling in a multi-threaded system. Some embodiments provide for dynamic control of scheduling, in which priority weights can be assigned for some or all of the threads in a multi-threaded system. The priority weights are employed to control the prioritization of thread instructions by a scheduler. An instruction count for each thread is used in combination with the priority weights to determine the prioritization order in which instructions are fetched and assigned to execution units for processing.

Figure 1:
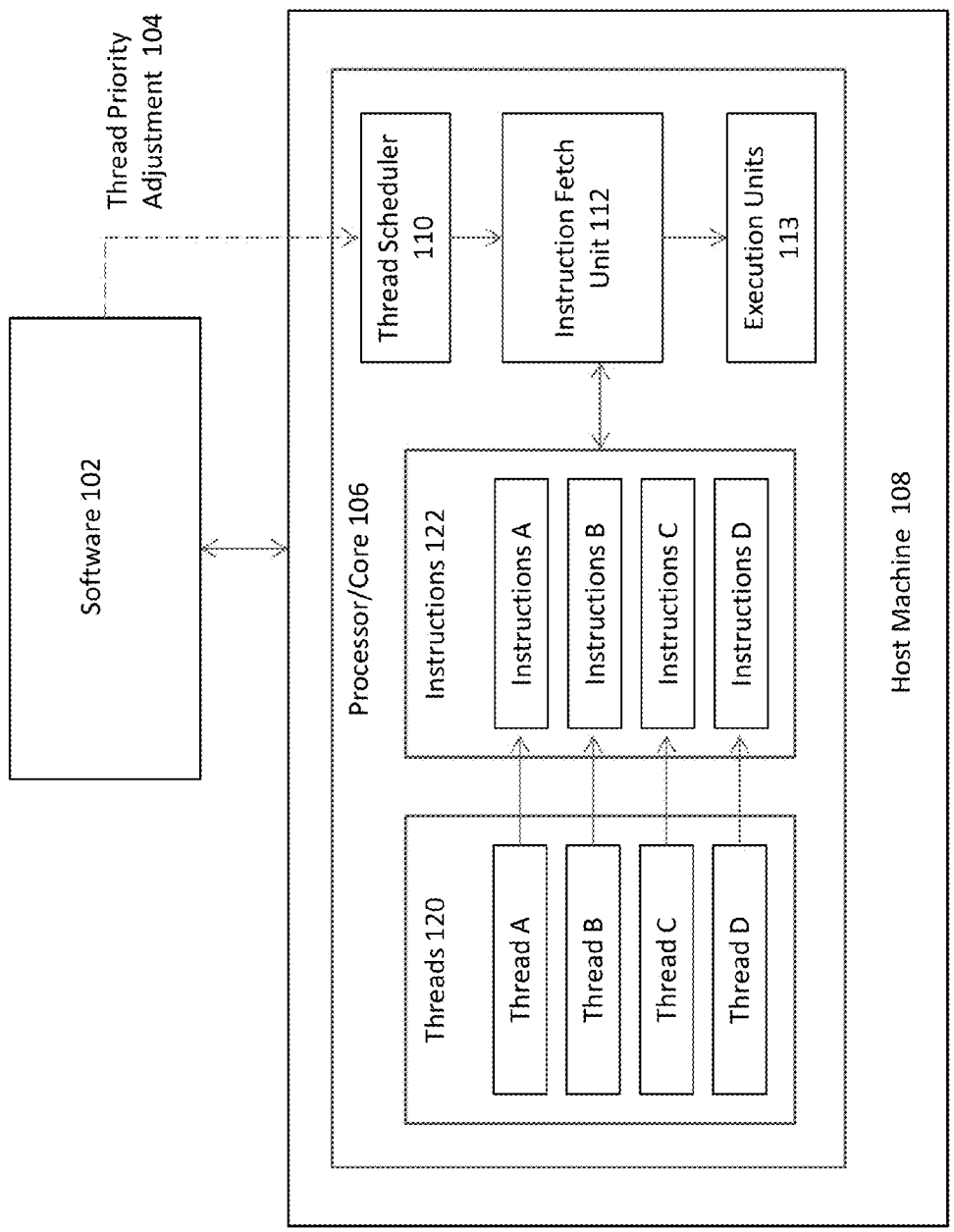
FIG. 1 illustrates an example system for performing scheduling.

FIG. 1 illustrates an example system for performing instruction scheduling according to some embodiments. The system includes a host machine 108 having one or more processors (or processor cores) 106. Each processor/core 106 is a multi-threaded unit that provides for the execution of multiple concurrent threads 120, such as threads A, B, C, and D. The multiple threads 120 will provide instructions 122 for processing by one or more execution units 113. In this example, thread A will provide instructions A for processing, thread B will provide instructions B, thread C will provide instructions C, and thread D will provide instructions D.

A thread scheduler 110 within the processor/core 106 manages the order and flow in which the instructions 122 from threads 120 are fetched by an instruction fetch unit 112. In the present embodiment, the thread scheduler 110 performs its functions using a thread priority adjustment input 104 that is provided to guide the scheduling of fetches by instruction fetch unit 112 of the instructions 122. The thread priority adjustment input 104 allows any entity to dynamically influence the manner in which the thread scheduler 110 operates. For example, the thread priority adjustment input 104 provides a prioritization value that can be used by the thread scheduler 110 to change the order of prioritization in which instructions 122 are fetched by instruction fetch unit 112, and which are then placed into an instruction pipeline for processing by execution units 113.

The thread priority adjustment input 104 may be provided by any entity, e.g., by an entity external to the processor/core 106. For example, as shown in this example, the thread priority adjustment input 104 is provided by software 102 that operates on the host machine 108. The software 102 may be application software within user space or operating system software that operates within kernel space on the host machine 108. Alternatively, the thread priority adjustment input 104 may be provided by an external hardware device or controller, or a combination of hardware and software.

The thread priority adjustment input 104 may be provided to fulfill any need or purpose that may exist to modify the order in which fetches of the instructions 122 by the instruction fetch unit 112 are scheduled by the thread scheduler 110. There may be circumstances in which it is desirable to control the prioritization of scheduling for the instructions 122 from the different threads 120, and this approach allows such control to be implemented.

To explain, consider a system in which a first thread is performing work of a very critical nature, but a second thread is performing extremely non-critical background work. In this situation, the more simplistic scheduling schemes would treat the threads equally regardless of the criticality and importance of the different threads. For example, in a simple round-robin scheme, each thread would have its instructions processed in round-robin order, without any regard for the importance of the work being performed. Given the differences in priority between the different threads, equal allocation of hardware resources to the work in round-robin order to both the non-critical thread and the critical threads is clearly undesirable. In the alternate simplistic instruction count approach, the highest priority is given to the thread that currently has the lightest current execution workload (i.e., giving the highest priority to the thread having the lowest number of instructions currently being processed in the instruction pipeline). This approach may actually result in a scheduling result that is the opposite of what is desired, by giving higher priority to the low-criticality thread simply because it has a lower instruction count as compared to the high-criticality thread.

With the present embodiment, priority weights can be assigned for some or all of the threads. An instruction count for each thread is used in combination with the priority weights to determine the prioritization order in which instructions are assigned to execution units for processing. The priority weighting provides a "weight" that adjusts the prioritization, upwards or downwards, for the different threads. This permits control over thread scheduling that can very effectively control the order in which the instructions are scheduled by the instruction scheduler.

Over time, the actual work being performed by the different threads will change. Therefore, it is quite possible that the priorities that should be assigned to the different threads may change as well over time. With the simplistic schemes that are static in nature, there is no effective way to account for such changes in thread priorities. The present approach, however, allows dynamic control to be imposed on thread scheduling, by changing the thread priority adjustments to change the priorities of the different threads. This permits the priority weightings for the threads to be changed for different time periods, which can therefore change thread scheduling to account for changes in thread priority/importance.

Figure 2:
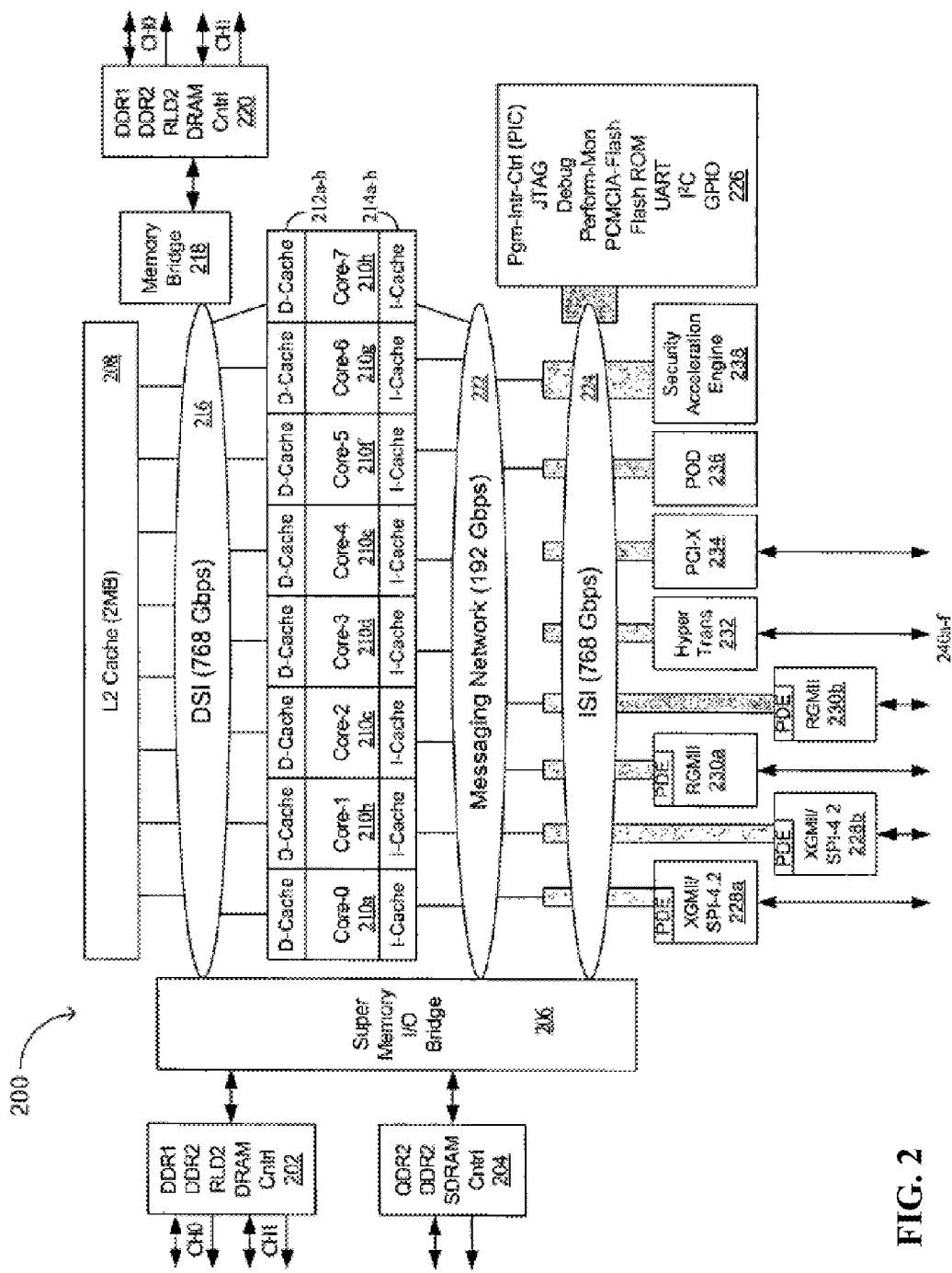
FIG. 2 illustrates an example multi-core, multi-threaded processor.

To illustrate the examples herein, shown in FIG. 2 is an exemplary processor 200 according to some embodiments. The processor 200 is an integrated circuit that can perform many of the functions previously tasked to specific integrated circuits. The processor 200 includes a plurality of multi-threaded processor cores 210a-h. Each core includes an associated data cache 212a-h and instruction cache 214a-h. Data Switch Interconnect (DSI) 216 may be coupled to each of the processor cores 210a-h and configured to pass data among the processor cores and between the L2 cache 208 and memory bridges 206, 218 for main memory access. Additionally, a messaging network 222 may be coupled to each of the processor cores 210a-h and a plurality of communication ports 240a-f. While eight cores are depicted in FIG. 2, a lesser or greater number of cores can be used.

The processor 200 includes high-speed processor input/output (I/O), which is supported by: two XGMII/SPI-4 ports (e.g., boxes 228a and 228b); three 1 Gb MACs; one 16-bit HyperTransport port (e.g., box 232) that can scale to 800/1600 MHz memory, including one Flash portion (e.g., box 226) and two Quad Data Rate (QDR2)/Double Data Rate (DDR2) SRAM portions; two 64-bit DDR2 channels that can scale to 400/800 MHz; and communication ports including 32-bit Peripheral Component Interconnect (PCI) (e.g., box 234), Joint Test Access Group (JTAG) and Universal Asynchronous Receiver/Transmitter (UART) (e.g., box 226). Also included as part of the interface are two Reduced GMII (RG-MII) (e.g., boxes 230a and 230b) ports. Further, Security Acceleration Engine (SAE) (e.g., box 238) can use hardware-based acceleration for security functions, such as encryption, decryption, authentication, and key generation. Such features can help software deliver high performance security applications, such as IPSec and SSL.

The processor 200 may further include a number of components that promote high performance, including: an 8-way set associative on-chip level-2 (L2) cache (2 MB) 208; a cache coherent Hyper Transport interface (768 Gbps); hardware accelerated Quality-of-Service (QOS) and classification; security hardware acceleration-AES, DES/3DES, SHA-1, MD5, and RSA; packet ordering support; string processing support; TOE hardware (TCP Offload Engine); and numerous IO signals. In one aspect of an embodiment, data switch interconnect 216 may be coupled to each of the processor cores 210a-h by its respective data cache 212a-h. Also, the messaging network 222 may be coupled to each of the processor cores 210a-h by its respective instruction cache 214a-h. Further, in one aspect of an embodiment, the L2 cache 208 is coupled to the data switch interconnect and configured to store information accessible to the processor cores 210a-h. In some embodiments, the L2 cache 208 includes the same number of sections (sometimes referred to as banks) as the number of processor cores.

"Bridges" on a data movement ring may be used for optimal redirection of memory and I/O traffic. Super Memory I/O Bridge 206 and Memory Bridge 218 of FIG. 2 may be separate physical structures, but they may be conceptually the same. The bridges can be the main gatekeepers for main memory and I/O accesses, for example. Further, in one embodiment, the I/O can be memory-mapped. The processor 200 can include Interface Switch Interconnect (ISI) 224 coupled to the messaging network 222 and a group of communication ports 240a-f, and configured to pass information among the messaging network 222 and the communication ports 240a-f. Further details regarding an exemplary processor 200 are described in U.S. Pat. No. 7,984,268, which is hereby incorporated by reference in its entirety.

Figure 3:
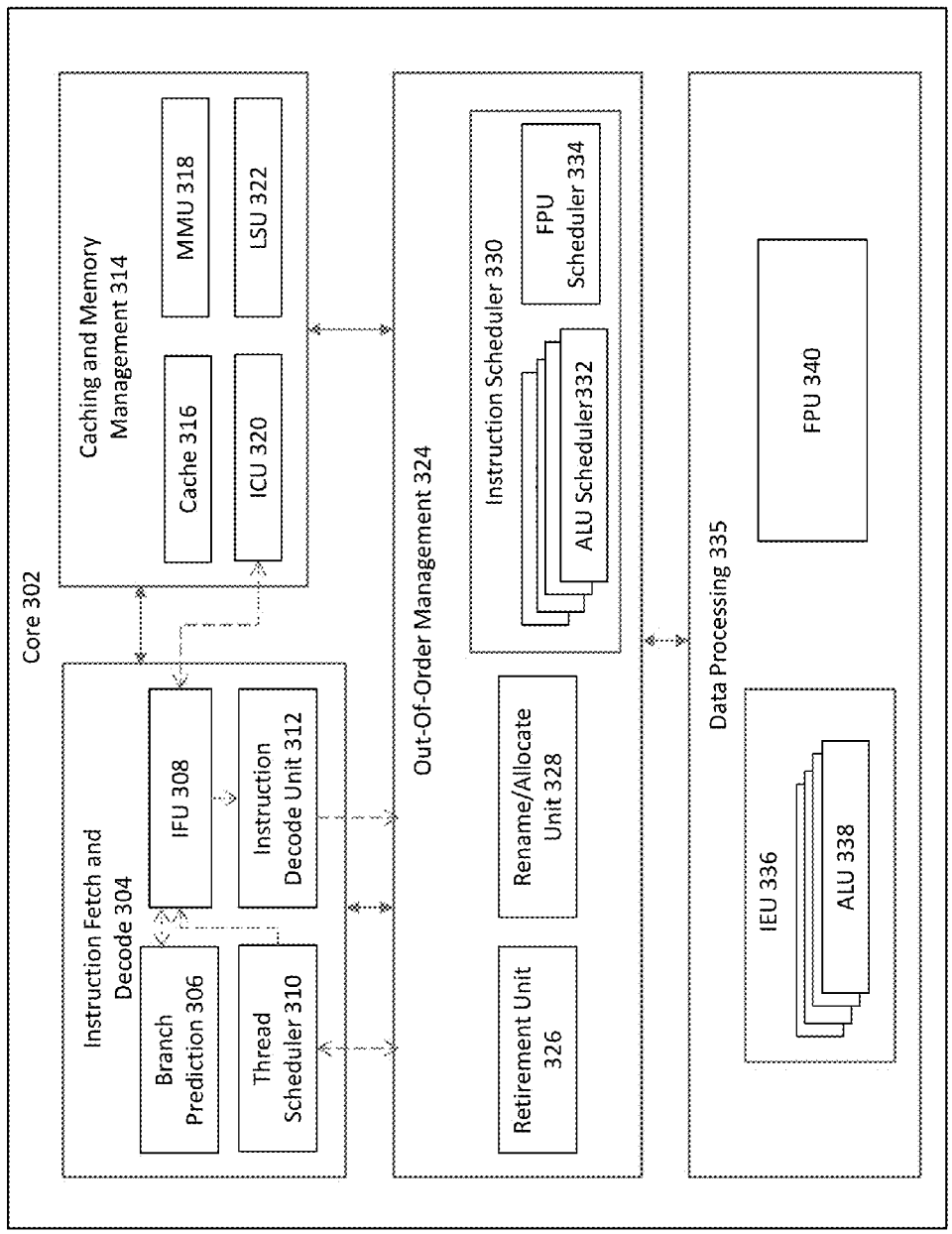
FIG. 3 illustrates components of an example core in a multi-core processor.

FIG. 3 illustrates the components within a core 302 of a multi-core processor according to some embodiments. The caching and memory management block 314 is responsible for performing instruction caching, data caching, and virtual memory management. The instruction fetch and decode block 304 performs instruction fetches and decode functions. The instruction fetch and decode block 304 includes a thread scheduling mechanism that is an example of the thread scheduler 110 (FIG. 1). The out-of-order management block 324 performs ordering (and out-of-order) management functions. Instruction scheduling and ordering are handled by this block 324. The data processing block 335 includes the units to perform the required arithmetic and logic operations on the data flowing through the processor core 302.

The caching and memory management block 314 operates to reduce execution latencies by keeping the most frequently used instructions and data as close as possible to the processor core 302. The Memory Management Unit (MMU) 318 translates virtual addresses into physical addresses. The Instruction Cache Unit (ICU) 320 contains an instruction cache, e.g., a 64-KB, Level-1 2-way set-associative instruction cache with a 32-byte line size. The Load Store Unit (LSU) 322 contains individual load/store units that each handle transfers between the register set and the memory subsystem for data transfers. The Secondary (Level-2) Cache Unit (SCU) 316 contains a cache to reduce cache-conflict misses, e.g., a 512-KB, Level-2, 8-way set-associative write-back cache with a 64-byte line size.

The instruction fetch and decode block 304 provides for a program instruction flow that minimizes the impact of data-dependent branches on program execution time. The Instruction Fetch Unit (IFU) 308 maintains the program counter (PC) for each of the threads in the core and sequences through the program flow. The IFU 308 also operates to fetch instructions from the ICU 320 in block 314. The Branch Prediction Unit (BPU) 306 predicts branches for each cycle so that correctly predicted branch can be re-steered the very next cycle. The Instruction Decoder Unit (IDU) 312 decodes the instructions for execution that are fetched by the IFU 308.

The out-of-order management block 324 operates to remove false register dependencies to facilitate out-of-order processing. Once the instructions are processed, this block 324 resequences the instructions in program order. The Rename/Allocate Unit (RAU) 328 removes false register dependencies by renaming the logical register to a physical location. The Instruction Scheduler Unit (ISU) 330 reorders the instruction flow to the data processing block 335 so that the appropriate number of instructions will be completed in any given cycle. The ISU 330 includes a floating point unit (FPU) scheduler 334 and one or more arithmetic logic unit (ALU) schedulers 332. The Retirement Unit (RU) 326 handles all of the in- and out-of-order completions coming from various units.

The Data Processing block 335 performs execution of arithmetic and logic operations on the data flowing through the processor core 302. The Integer Execution Unit (IEU) 336 includes one or more ALUs 338, and handles the integer arithmetic, branch target calculation, and General Purpose Register (GPR) to GPR conditional moves. The Floating-point Execution Unit (FPU) 340 handles the single, double, and paired-single floating-point computation operations.

The Thread Scheduling Unit (TSU) 310 in block 304 is the component that performs dynamic control of thread scheduling as described herein. The TSU 310 supports a dynamic Instruction Count (ICOUNT) scheduling algorithm where the thread that has the least number of outstanding instructions is favored, and in which priority weightings may be applied to adjust the priorities of the different threads. The TSU 310 provides scheduling and prioritization instructions to control the fetches performed by the IFU 308, which are then decoded by the instruction decode unit 312 and sent to block 324 for allocation and scheduling for eventual execution by the data processing block 335.

Figure 4:
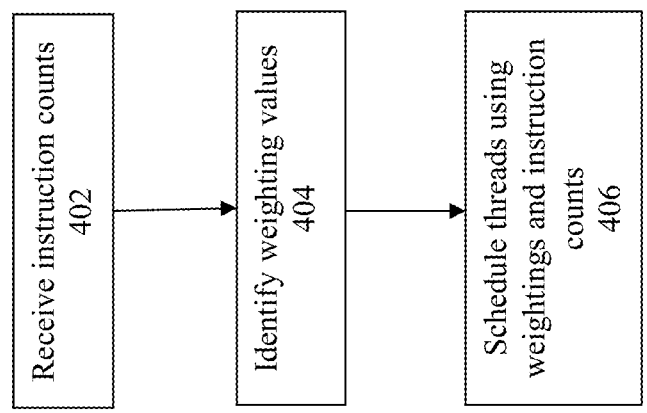
FIG. 4 shows a flowchart of an approach for performing scheduling with priority weights and an instruction count.

FIG. 4 shows a flowchart of an approach for performing priority weighted instruction count scheduling according to some embodiments. The approach illustrated in FIG. 4 is performed, for example, by the TSU 310. At 402, instruction counts are received for the threads of interest. According to some embodiments, the instruction count values are maintained in a register that is maintained within the processor/core. This register is accessed to obtain the instruction count values at 402.

Next, at 404, priority weighting values are determined for the different threads. A determination is made whether any priority weighting adjustments have been received where the priority weighting adjustments may be provided by any entity that is permitted to provide such inputs. For example, the priority weighting adjustments may be provided by software to control the relative priorities of the different threads in a multi-threaded system. If there are no priority weighting adjustments being provided, then default weighting values are employed to schedule the threads. In some embodiment, the default setting is for all the threads to have equal weightings.

If priority weighting adjustments are being provided, then those priority weighting adjustments are used to adjust the priority weighting for the respective threads being adjusted. To the extent only some of the threads are adjusted by the priority weighting adjustments, then the remaining threads that are not being adjusted will be associated with default weighting values.

At 406, the weighting values are used in conjunction with the instruction count values to determine scheduling prioritizations for the threads. The results of this determination will control which thread will have its instructions prioritized for processing.

Figure 5:
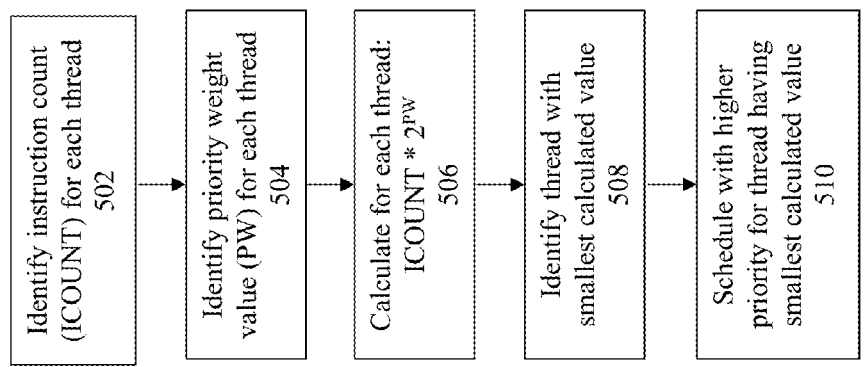
FIG. 5 shows a detailed flowchart of an approach for calculating prioritizations when performing scheduling with priority weights and instruction counts.

FIG. 5 shows a detailed flowchart of an approach that can be taken to implement the process of FIG. 4. At 502, an instruction count value (ICOUNT) is identified for each thread which identifies the number of in-flight instructions that are associated with that thread. This instruction count value is obtained by reading from the appropriate register maintained to hold this information.

At 504, a priority weight value (PW) is identified for each thread. To the extent this value is provided for any thread by an entity to control the thread scheduling, then those provided values are identified in this step. To the extent this value is not provided for any particular thread, then a default value is used for those threads.

At 506, a prioritization value (PV) is calculated for each thread using both the instruction count value (ICOUNT) and the priority weight value (PW). In some embodiments, the prioritization value is calculated using the following equation:

$$PV = ICOUNT * 2^{PW}$$

The general idea is that the priority weighting value can be used to either increase or decrease the priority of a given thread. With this type of equation, the thread having the lowest PV value would have the highest priority for scheduling purposes. Therefore, assigning a relatively higher PW value to a thread would lower the priority of that thread. On the other hand, assigning a relatively lower PW value would increase the priority of that thread. (Alternatively, an equation for calculating prioritization values may be used in which assigning a higher PW value to a thread decreases the value of PV and thus increases the priority of that thread. An example of such an equation is $PV=ICOUNT*(1/2^{PW})$.)

This approach improves over the simplistic approach that determines priorities based only on the instruction count, in which higher priority is given to the thread that currently has the lightest current execution workload (i.e., giving the highest priority to the thread having the lowest ICOUNT value). In contrast, the current approach allows for very effective control over the prioritization of threads, by merely adjusting the priority weighting value for any thread for which it is desired to control its weighting. This approach is also very efficient to implement, since only a relatively inexpensive SHIFT operation is needed to implement the multiply operation for numbers that are a power of "2" as required by this equation.

At 508, the results of the prioritization value calculations are checked to determine the threads having calculated prioritization values that are smaller than the other threads. At 510, the threads with smaller calculated prioritization values are scheduled with higher priorities as compared to threads with larger calculated prioritization values.

FIGS. 6A-F and 7A-F provide two different illustrative examples of this approach to performing thread scheduling. The example of FIGS. 6A-F shows a situation when default prioritization weighting values are used, e.g., in circumstances when the user/software does not provide any adjustments to the prioritization weightings for threads. The example of FIGS. 7A-F show an example when prioritization weighting values are provided by a user/software to change the default prioritization weighting values of the threads.

Figure 6A:
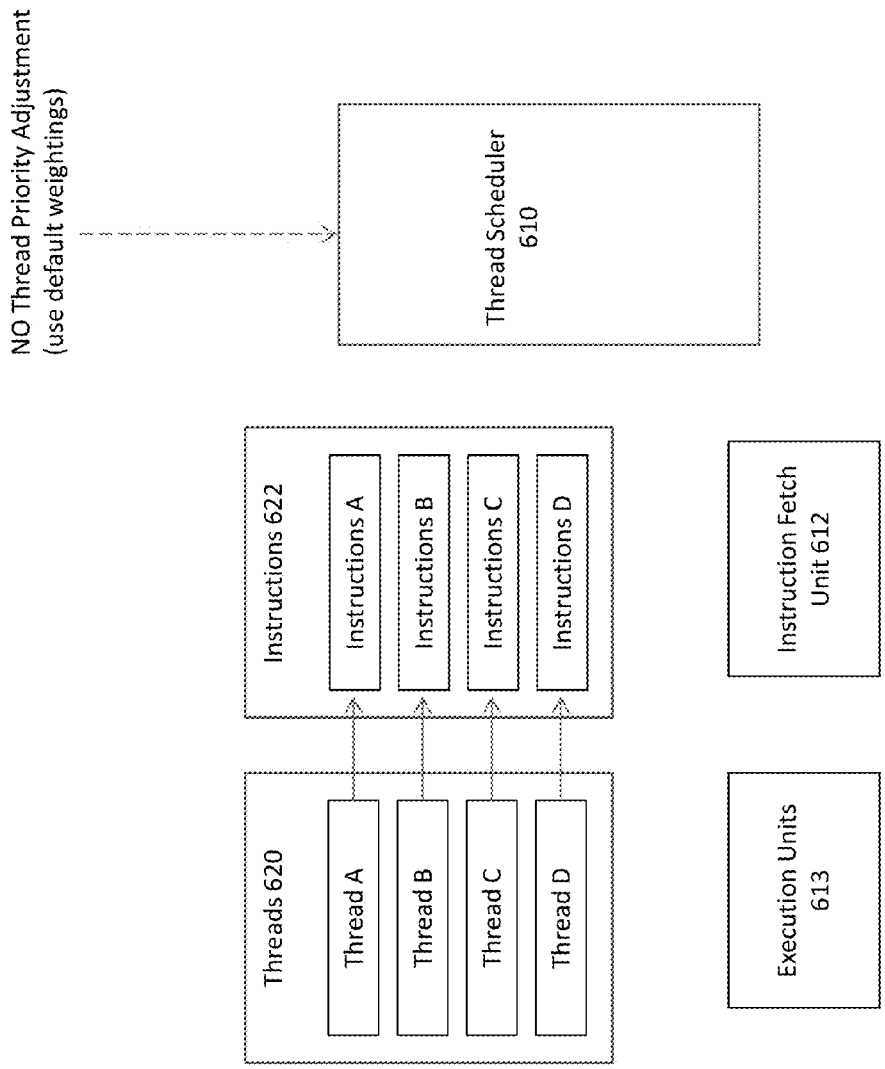

FIG. 6A shows a set of threads 620 in a processor/core that are producing instructions 622 for processing. The set of threads includes four threads A, B, C, and D. Thread A has generated instructions A for processing. Similarly, thread B has generated instructions B for processing, thread C has generated instructions C for processing, and thread D has generated instructions D for processing. An instruction fetch unit (IFU) 612 is used to fetch instructions 622 for processing by execution units 613.

A thread scheduler 610 manages the prioritization of the threads 620 to determine a schedule by which the IFU 612 will fetch instructions 622 for processing. For purposes of this example, it is assumed that the user/software has not provided any adjustments to the prioritization weightings to be used by the thread scheduler 610.

Figure 6B:
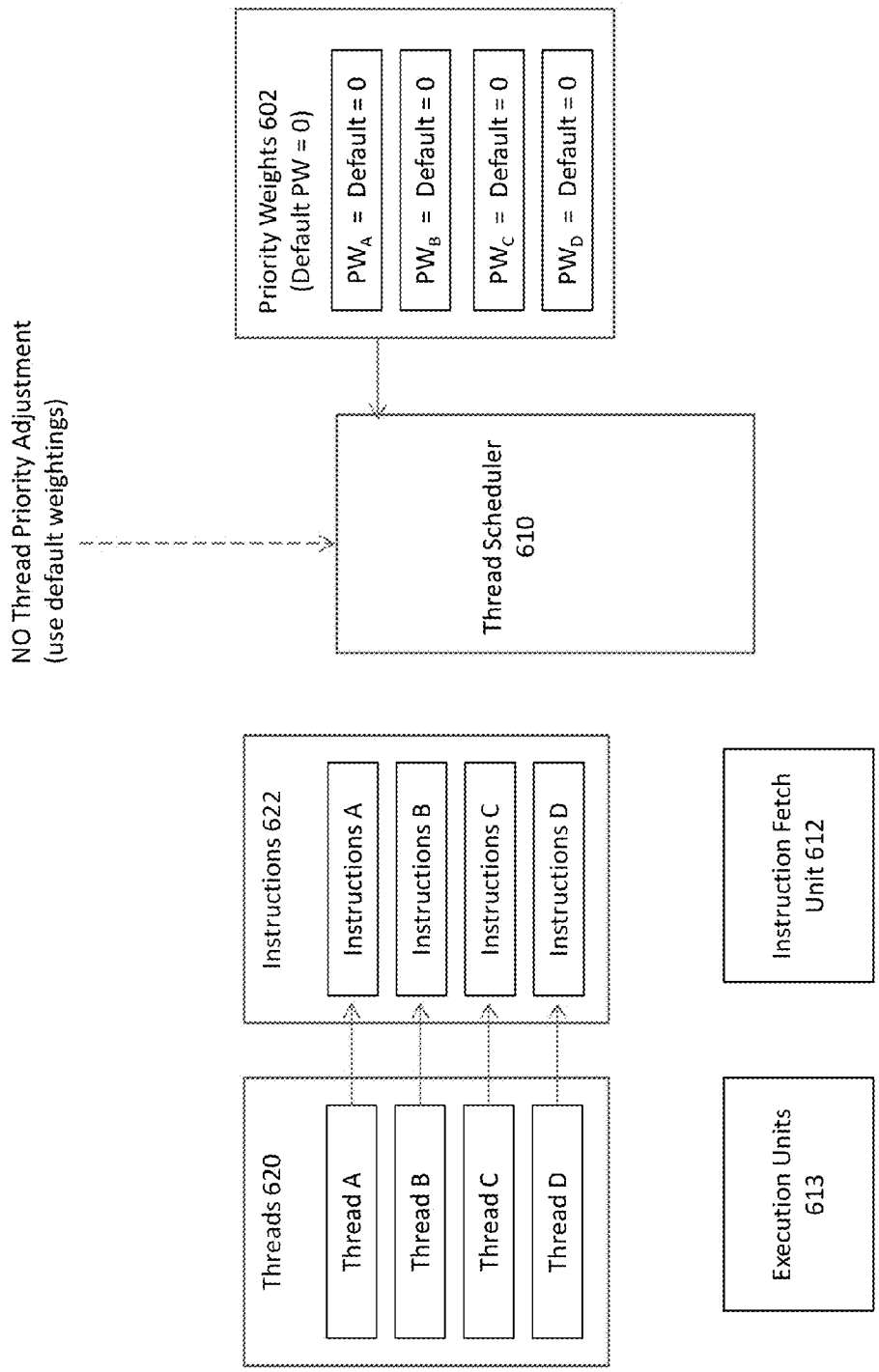

FIG. 6B shows the thread scheduler 610 performing the action of identifying priority weighting values 602 for each of the threads. As previously noted, this example situation assumes that the user/software has not provided any adjustments to the prioritization weightings 602 to be used by the thread scheduler 610. Therefore, each of the threads will be associated with the default priority weighting value. For this example, the default priority weighting value is "0".

Figure 6C:
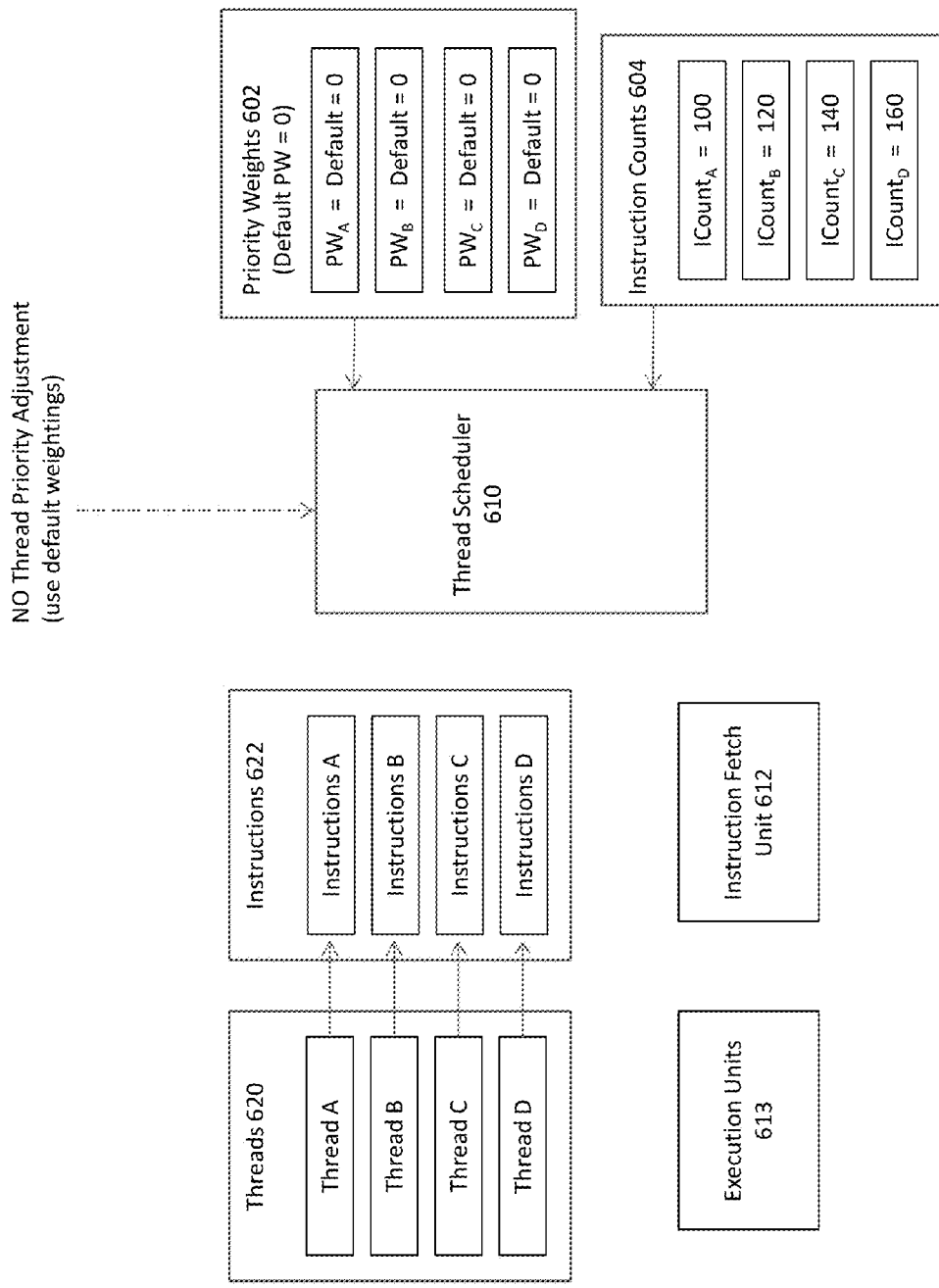

FIG. 6C shows the thread scheduler performing the action of identifying the instruction count values (ICOUNT) 604 for each of the threads, which is a count of the number of instructions currently in the instruction pipeline for each thread. For purposes of this example, it is assumed the $ICOUNT_A$ value for thread A is "100", the $ICOUNT_B$ value for thread B is "120", the $ICOUNT_C$ value for thread C is "140", and the $ICOUNT_D$ value for thread D is "160".

The next action is to calculate the prioritization value for each thread, as shown in FIG. 6D. This action is performed by calculating the value of the following equation for each of the threads: $PV=ICOUNT*2^{PW}$. For thread A which has an $ICOUNT_A$ value of "100" and the default prioritization value $PW_A$ of "0", the equation $PV=ICOUNT*2^{PW}$ is determined for $PV=100*(2^0)$ resulting in a $PW_A$ value of "100". For thread B which has an $ICOUNT_B$ value of "120" and the default prioritization value $PW_B$ of "0", the equation $PV=ICOUNT*(2^{PW})$ is determined for $PV=120*(2^0)$ resulting in a $PW_B$ value of "120". For thread C which has an $ICOUNT_C$ value of "140" and the default prioritization value $PW_C$ of "0", the equation $PV=ICOUNT*(2^{PW})$ is determined for $PV=140*(2^0)$ resulting in a $PW_C$ value of "140". For thread D which has an $ICOUNT_D$ value of "160" and the default prioritization value $PW_D$ of "0", the equation $PV=ICOUNT*(2^{PW})$ is determined for $PV=160*(2^0)$ resulting in a $PW_D$ value of "160".

The next action is to identify the thread having the smallest prioritization value, as shown in FIG. 6E. In this example, it can be seen that threads A has the lowest prioritization value of "100". This means that thread A has the highest priority for having its instructions scheduled for execution.

Figure 6F:
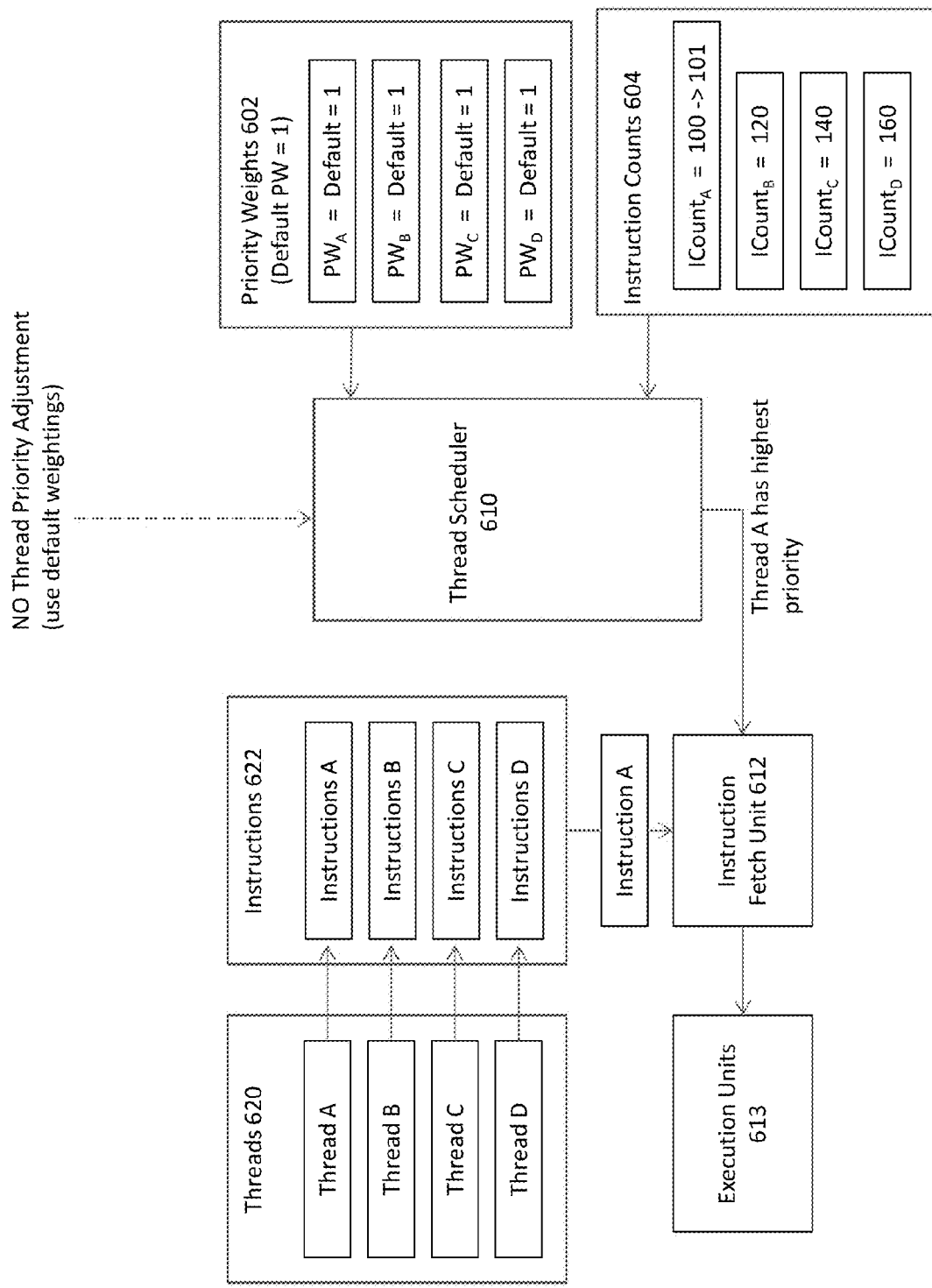

As shown in FIG. 6F, then thread scheduler 610 can now instruct the IFU 612 with an appropriately prioritized schedule for fetching instructions 122 for execution. In this example, since thread A has the highest priority, the instruction A from thread A is fetched by the IFU 612 to be placed into the pipeline for execution by execution units 613. The ICOUNT for thread A is therefore incremented from "100" to "101".

Figure 7A:
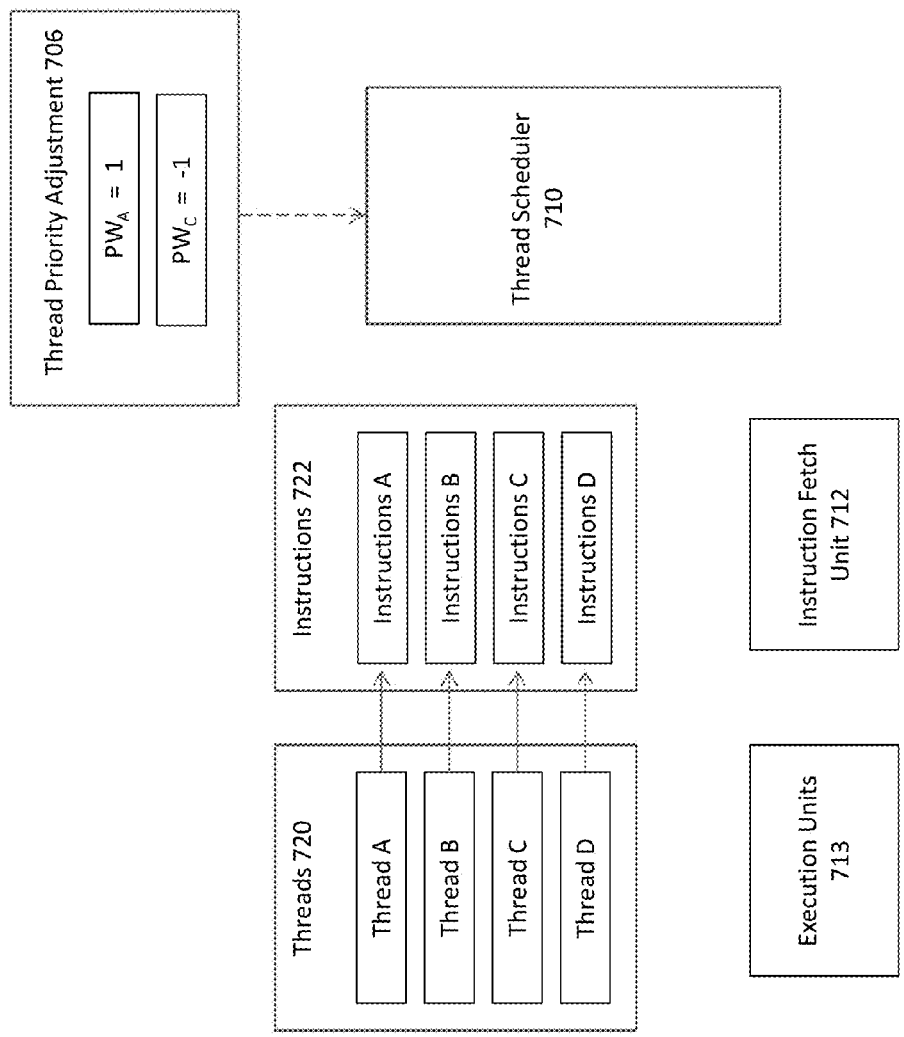

FIGS. 7A-F show an example situation when thread priority adjustments 706 are provided by a user/software to change the default prioritization weighting values. In particular, as shown in FIG. 7A, the thread priority adjustments 706 include an adjustment to the priority weighting values for both thread A and thread C. Thread A has its priority weighting value adjusted to a larger number "1", which will relatively decrease its priority by the instruction scheduler 710. In contrast, thread C has its priority weighting value adjusted to a smaller number "−1", which will relatively increase its priority by the instruction scheduler 710.

FIG. 7A also shows a set of threads 720 (similar to the set 620 of FIGS. 6A-F as described before) which produces instructions 722 for processing. The set of threads 720 includes four threads A, B, C, and D. Thread A has generated instructions A for processing, thread B has generated instructions B for processing, thread C has generated instructions C for processing, and thread D has generated instructions D for processing. An instruction fetch unit (IFU) 712 is used to fetch instructions 722 for processing by the execution units 713.

Figure 7B:
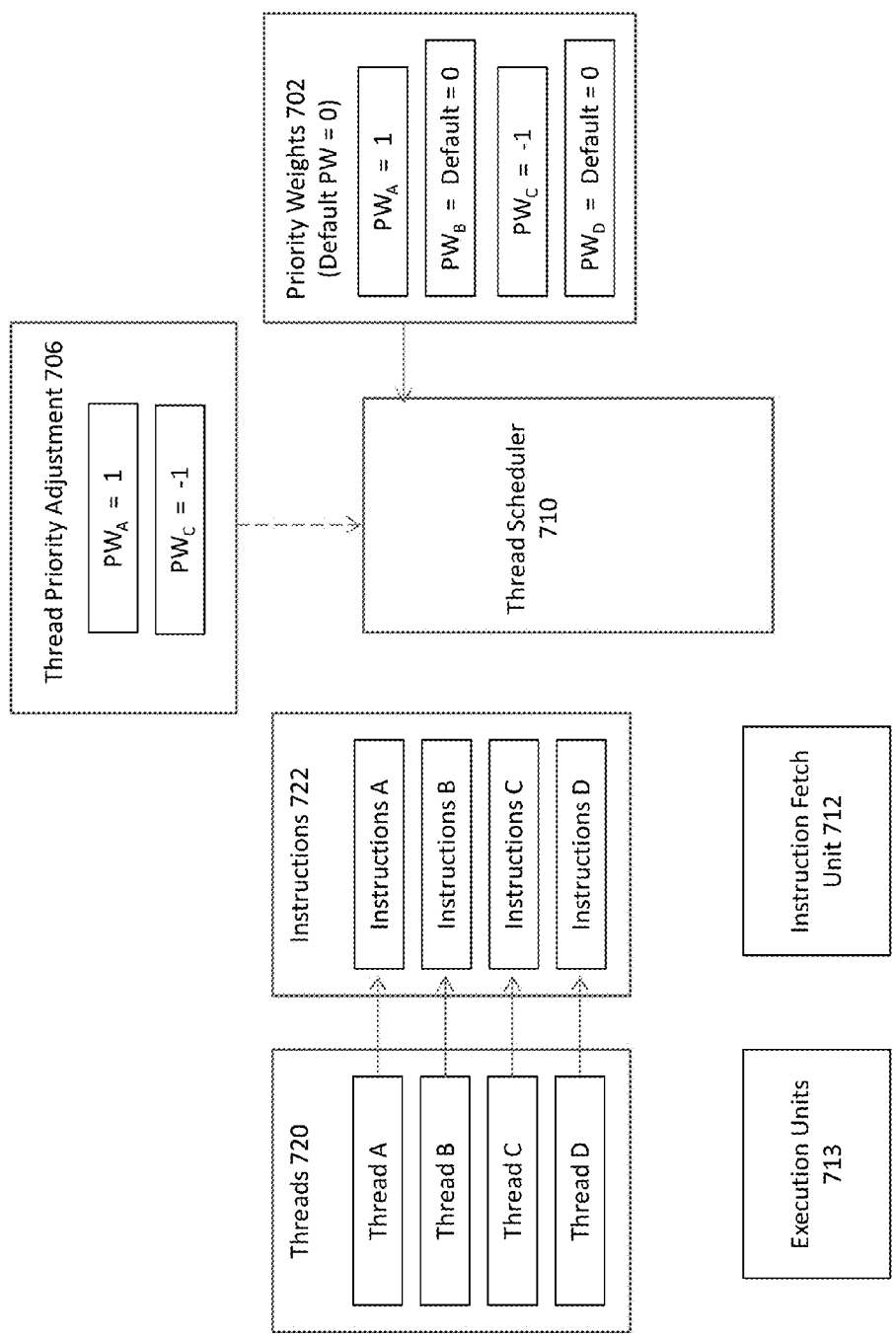
Figure 7C:
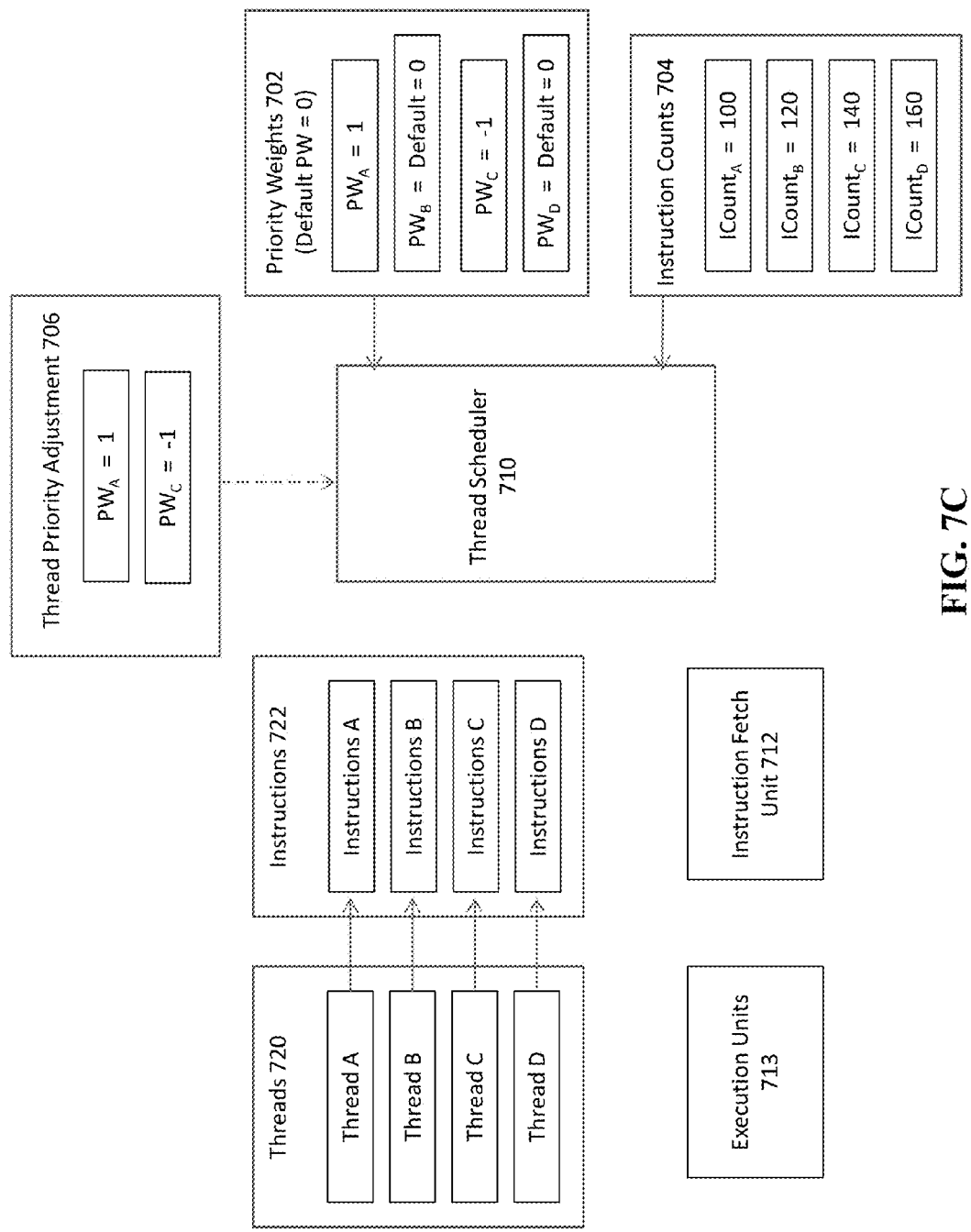

FIG. 7B shows the thread scheduler 710 performing the action of identifying priority weighting values 702 for each of the threads. As discussed above, this example assumes that thread A has its priority weighting value $PW_A$ adjusted to the value of "1" and that thread C has its priority weighting value $PW_C$ adjusted to the value of "−1". Threads B and D did not have their weighting values adjusted by the thread priority adjustments 706. Therefore, each of the threads B and D will be associated with the default priority weighting value. For this example, the default priority weighting value is FIG. 7C shows the thread scheduler 610 performing the action of identifying the instruction count values (ICOUNT) 604 for each of the threads. As before, it is assumed the $ICOUNT_A$ value for thread A is "100", the ICOUNT$_B$ value for thread B is "120", the ICOUNT$_C$ value for thread C is "140", and the ICOUNT$_D$ value for thread D is "160".

The next action is to calculate the prioritization value for each thread, as shown in FIG. 7D. This action is performed by calculating the value of the following equation for each of the threads: PV=ICOUNT*($2^{PW}$). For thread A which has an ICOUNT$_A$ value of "100" and the newly set prioritization value PW$_A$ of "1", the equation PV=ICOUNT*($2^{PW}$) is determined for PV=100*($2^1$) resulting in a PW$_A$ value of "200". For thread B which has an ICOUNT$_B$ value of "120" and the default prioritization value PW$_B$ of "0", the equation PV=ICOUNT*($2^{PW}$) is determined for PV=120*($2^0$) resulting in a PW$_B$ value of "120". For thread C which has an ICOUNT$_C$ value of "140" and the new prioritization value PW$_C$ of "−1", the equation PV=ICOUNT*($2^{PW}$) is determined for PV=140*($2^{-1}$) resulting in a PW$_C$ value of "70". For thread D which has an ICOUNT$_D$ value of "160" and the default prioritization value PW$_D$ of "0", the equation PV=ICOUNT*($2^{PW}$) is determined for PV=160*($2^0$) resulting in a PW$_D$ value of "160".

The next action is to identify the thread having smallest prioritization value, as shown in FIG. 7E. In this example, it can be seen that thread C has the lowest prioritization value of "70". This means that thread C has the highest priority for having its instructions scheduled for execution. This is quite different from the result of the example of FIGS. 6A-F, where thread A had the lowest value. In fact, since thread A had its prioritization weighting value adjusted to "1" (the highest PW value), it is now has the highest PV value (200) and therefore becomes the lowest priority thread.

Figure 7F:
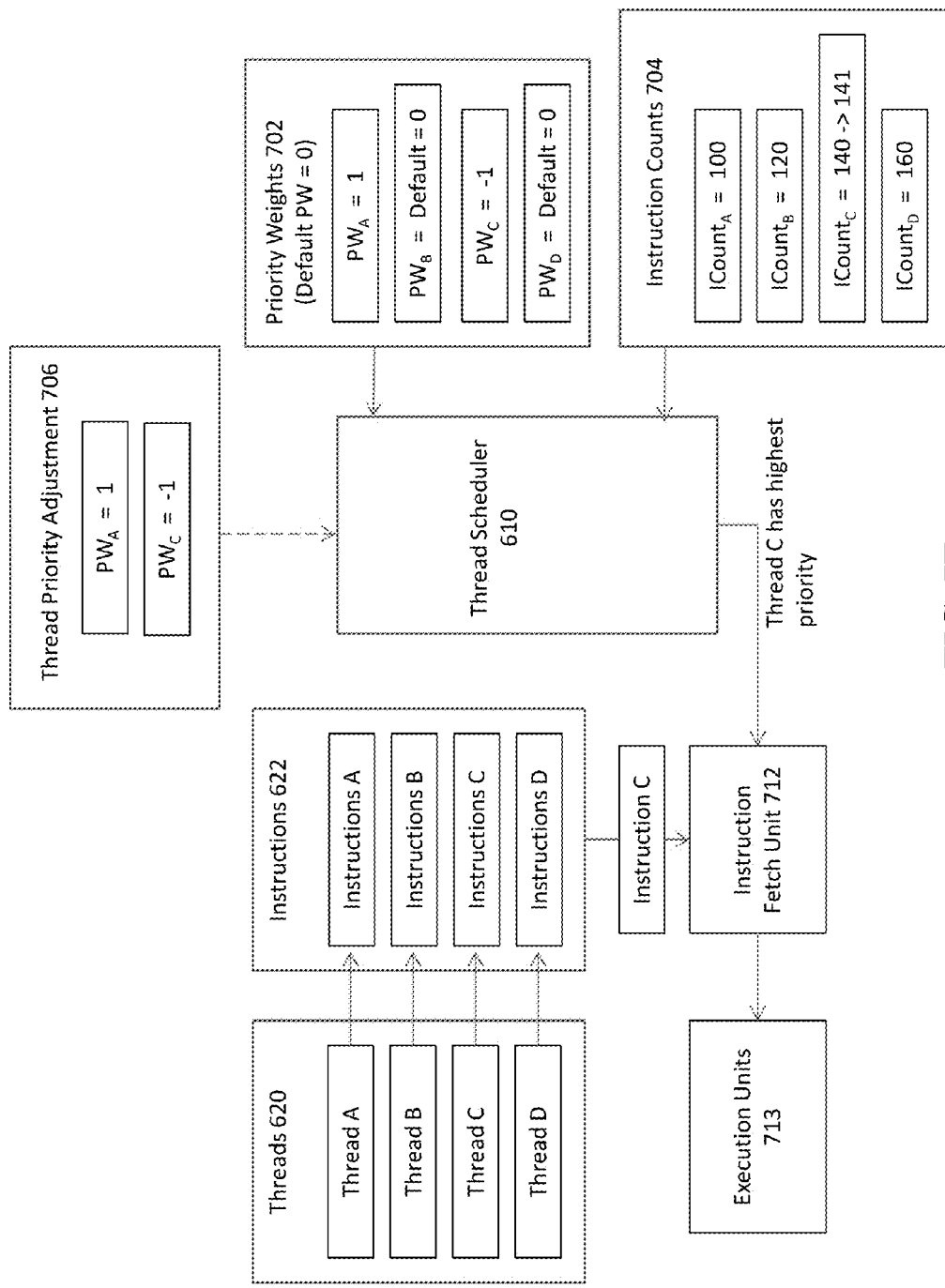

As shown in FIG. 7F, thread scheduler 710 can now instruct the IFU 712 with an appropriately prioritized schedule for fetching instructions 722 for execution. In this example, since thread C has the highest priority, the instruction C from thread C is fetched by the IFU 712 to be placed into the pipeline for execution by execution units 713. The ICOUNT for thread C is therefore incremented from "140" to "141".

Therefore, what has been disclosed is a more efficient and effective way to perform thread scheduling. Dynamic control of scheduling is provided, in which priority weights can be assigned for some or all of the threads in a multi-threaded system. The priority weights are employed to control the prioritization of thread instructions by the scheduler. An instruction count for each thread is used in combination with the priority weights to determine the prioritization order in which instructions are fetched and assigned to execution units for processing. The priority weighting values can be used to either increase or decrease the priority of a given thread. For example, the thread having the lowest priority weighting value would have the highest priority for scheduling purposes. Therefore, giving a thread a relatively lower priority weighting value would lower the priority of that thread. On the other hand, giving a thread a relatively higher priority weighting value would increase the priority of that thread.

This approach is an improvement over the simplistic alternatives that determine priorities based only on the instruction count, in which the priority is given to the thread that has the lightest current execution workload (i.e., giving the highest priority to the thread having the lowest ICOUNT value). The use of dynamically adjustable priority weighting values allows for very effective control over the prioritization of threads, by merely adjusting the priority weighting value for any thread for which it is desired to control its weighting. This approach is also very efficient to implement, since only a relatively cheap SHIFT operation is used to implement the divide operation for numbers that are a power of "2" in accordance with some embodiments.

In the foregoing specification, examples of embodiments have been described. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting their scope or operation. The specification and drawings are, accordingly, to be regarded in an illustrative rather than restrictive sense.

What is claimed is:

1. A processor, comprising:
   an instruction fetch unit to fetch instructions generated by a plurality of threads; and
   a thread scheduler to generate a schedule for fetches by the instruction fetch unit based at least in part on priority values assigned to the plurality of threads, wherein a priority value assigned to a thread from the plurality of threads is computed by adjusting an instruction count for the thread using a priority weighting for the thread.

2. The processor of claim 1, further comprising a register to store the instruction count to track a count of instructions currently in an execution pipeline for the thread.

3. The processor of claim 1, wherein the instruction count (ICount) adjusted using the priority weighting (PW) to compute the priority value (PV) according to the following equation: PV=(ICount*$2^{PW}$).

4. The processor of claim 3, wherein a lower priority value resulting from the equation is associated with a higher priority in the schedule for the thread.

5. The processor of claim 1, further comprising an instruction cache unit, wherein the instruction fetch unit is to fetch the instructions from the instruction cache unit according to the schedule.

6. The processor of claim 2, wherein the thread scheduler reads the instruction count from the register in the processor, and wherein the thread scheduler receives the priority weighting from software that operates a system incorporating the processor.

7. The processor of claim 1, in which the priority weighting is dynamically assignable to the thread.

8. The processor of claim 1, in which a default priority weighting value is associated with the thread in the absence of a specific assignment of the priority weighting to the thread.

9. The processor of claim 1, further comprising one or more execution units to execute instructions fetched in accordance with the schedule.

10. A method comprising:
    receiving an instruction count for a thread from a plurality of threads executing in a processor;
    receiving a priority weighting for the thread;
    generating a schedule for fetching instructions associated with the plurality of threads based at least in part on priority values assigned to the plurality of threads, wherein a priority value assigned to the thread is computed by adjusting the instruction count using the priority weighting; and
    fetching the instructions for execution using the schedule.

11. The method of claim 10, wherein the instruction count (ICount) is adjusted using the priority weighting (PW) to compute the priority value (PV) according to the following equation: PV=(ICount*$2^{PW}$).

12. The method of claim 11, in which a lower priority value resulting from the equation is associated with a higher priority for the thread in the schedule.

13. The method of claim 10, in which the instruction count corresponds to a number of instructions currently in an execution pipeline for the thread.

14. The method of claim 13, wherein the instruction count is read from a processor register storing the instruction count, and wherein the priority weighting is provided by software that operates a system incorporating the processor.

15. The method of claim 10, in which the priority weighting is dynamically assigned to the thread.

16. The method of claim 10, in which a default priority weighting value is assigned to the thread in the absence of a specific assignment of the priority weighting to the thread.

17. The method of claim 10, further comprising executing the fetched instructions.

18. The method of claim 10, in which a relatively higher priority is assigned to a first thread as compared to a second thread.

19. The method of claim 10, wherein the priority value is calculated by performing a shift operation on the instruction count using the priority weighting.

20. The processor of claim 1, wherein the priority value is calculated by performing a shift operation on the instruction count using the priority weighting.

\* \* \* \* \*

UNITED STATES PATENT AND TRADEMARK OFFICE
CERTIFICATE OF CORRECTION

PATENT NO. : 9,069,564 B1
APPLICATION NO. : 13/396007
DATED : June 30, 2015
INVENTOR(S) : Rashid et al.

Page 1 of 1

It is certified that error appears in the above-identified patent and that said Letters Patent is hereby corrected as shown below:

Claims

In column 10, line 27, claim 3, please replace "(ICount) adjusted" with --(ICount) is adjusted--.

Signed and Sealed this
Twenty-fourth Day of November, 2015

Michelle K. Lee
*Director of the United States Patent and Trademark Office*